INVENTOR
GEORGE C. IMES
BY Teare, Teare & Sammon
ATTORNEYS

Feb. 11, 1969 G. C. IMES 3,427,630

FLUID PRESSURE RECORDER

Filed April 21, 1967 Sheet 2 of 2

INVENTOR

GEORGE C. IMES

BY Teare, Teare & Sammon

ATTORNEY 3,427,630

FLUID PRESSURE RECORDER

George C. Imes, 5370 Winchester Ave.,
Portsmouth, Ohio 45662

Filed Apr. 21, 1967, Ser. No. 632,659
U.S. Cl. 346—36 14 Claims
Int. Cl. G01d 9/12

ABSTRACT OF THE DISCLOSURE

A device for determining the operating characteristics of an internal combustion engine which determines and/or records variations in pressure of a gaseous fluid stream including a housing adapted to receive a gaseous fluid stream at one end and having a pressure responsive member pivotally connected at the other end which is adapted to be actuated in response to variations in pressure of the gaseous fluid stream. A recording mechanism is operably connected with the pressure responsive member to visually indicate and/or record variations in the pressure of the gaseous fluid stream in response to actuation of the pressure responsive member.

*Background of the invention*

Heretofore, various types of devices have been employed for determining the operating characteristics of an internal combustion engine. Such devices, however, have not been entirely satisfactory as requiring highly intricate mechanical and/or electrical components which are not only costly to produce, but which are difficult to operate.

One such device has utilized a series of vertically oriented tubes of non-uniform cross-section wherein the pressure at spaced points along the tubes was compared. Such device, however measures the presence of certain combustion products by comparison of the viscosity and density with the original gaseous mixture to determine pressure variations.

Another device has utilized the thermo conductivity of a conductor for determining the operating efficiency of an internal combustion engine. In such case, the thermo conductivity of the conductor varies dependent upon the quantity of carbon present in the atmosphere surrounding the conductor. Such device not only requires intricate mechanical components and electrical circuitry, but requires extensive operator training and the use of previously compiled informational data in order to make a determination of the results obtained.

*Summary of the invention*

A fluid pressure sensing and/or recording device for use with an internal combustion engine or the like comprising a housing adapted to transmit a gaseous fluid stream from one end thereof. A fluid pressure responsive means operably associated with the other end of the housing for actuation in response to variations in pressure of the gaseous fluid stream and a recording mechanism operably associated with the fluid pressure responsive means to provide a visual indication and/or recording of variations in pressure of the gaseous fluid stream in response to actuation of the fluid pressure responsive means. The invention further includes a selectively adjustable counterweight means operably associated with the fluid pressure responsive means for maintaining precise actuation of such fluid pressure responsive means and selectively adjustable connection means operably connecting the fluid pressure responsive means to the recording means for controlling the visual indication and/or recording of variations in pressure of the gaseous fluid stream.

The invention provides a simple, inexpensive, yet effective device for sensing and/or recording pressure variations in a gaseous fluid stream, such as in the combustion products produced from an internal combustion engine. Such device is compact and is readily portable for use in determining the proper "tuned" condition of an internal combustion engine of the type used with an automotive vehicle.

*Description of the preferred embodiments*

Figure 1:
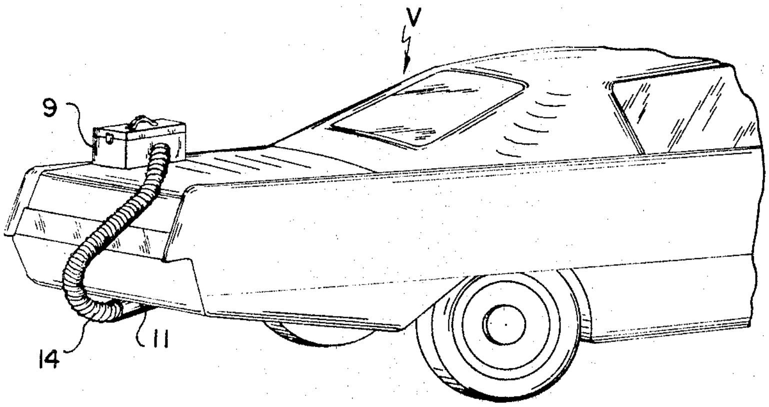
FIG. 1 is a fragmentary, generally perspective view showing the fluid pressure sensing and/or recording device of the invention mounted for use with an automotive vehicle.

Referring again to the drawings and in particular to FIG. 1 thereof, the fluid pressure sensing and/or recording device, designated generally at 8, is shown mounted for use on the rear trunk section of an automotive vehicle V of the type driven by an internal combustion engine (not shown). The device 8 may be housed within a portable carrier 9, such as a lid-type container, for convenient portability and usage thereof. As shown, the device 8 may be connected in fluid communication with the exhaust outlet pipe 11 of the vehicle V by means of a suitable conduit 14, such as a flexible tube or the like.

In the invention, the device 8 preferably includes a housing 10 mounted on a support or base member 12. The conduit 14 may be readily inserted into one end of the housing 10 for delivering exhaust gas from the pipe 11 through the housing. A pressure responsive means 18 including a movable plate 19 is pivotally connected adjacent the other end of the housing 10. The plate 19 is constructed and arranged so as to pivot about a horizontal axis and transversely of the longitudinal central axis of the housing 10 in repsonse to pressure variations in the gaseous fluid stream transmitted through the housing. A recording means 65 including an inscribing element, such as a stylus 22, is operably connected to the plate 19 for visually indicating and/or permanently recording pressure variations in the gaseous fluid stream in response to pivotal movement of the plate 19. By this arrangement, any variations in pressure of the gaseous fluid stream will be detected and visually indicated and/or recorded which enables the operator to readily determine whether the engine is in a properly "tuned" condition for smooth operation thereof.

Figure 2:
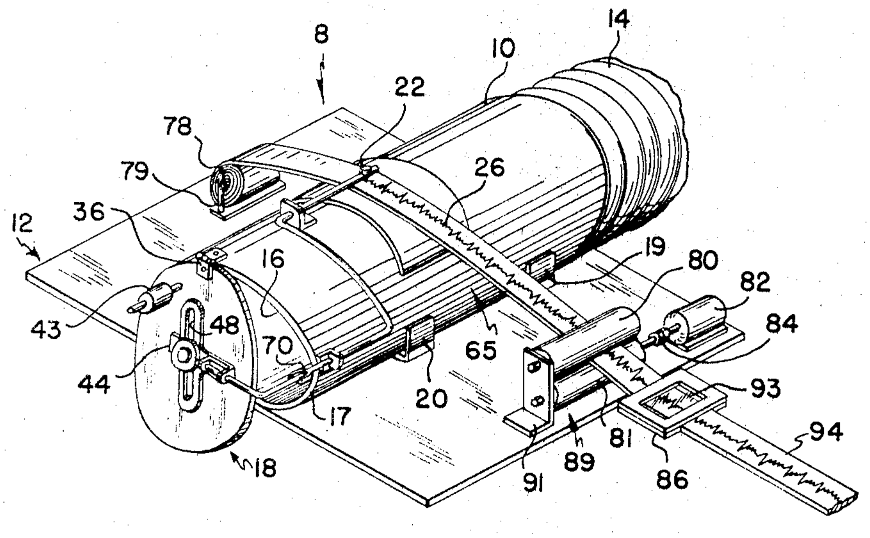
FIG. 2 is a fragmentary, generally perspective view on an enlarged scale of the device removed from the assembly of FIG. 1.

Now more specifically and with reference to FIG. 2 of the drawings, the housing 10 in the form shown is preferably of a cylindrical construction having its longitudinal central axis disposed in generally parallel relationship with respect to the general plane of the base 12. The housing 10 is preferably made of a metallic material, but may be made of any suitable material, such as plastic or the like. As shown, the housing 10 may be attached to the base 12 by generally U-shaped brackets 19 and 20 and/or by the use of weldments, as desired.

Figure 4:
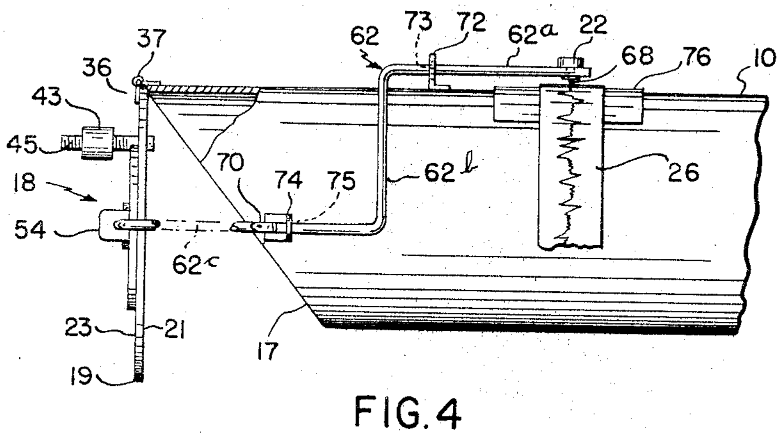
FIG. 4 is a fragmentary, side elevation view of the device shown in FIG. 3.

The housing 10 has an opening, as at 16, adjacent the end remote from the inlet conduit 14 for discharge of the gaseous fluid stream therefrom. As shown, the opening 16 is formed by the marginal end edge 17 of the housing 10 with such edge forming the surface of a plane which is disposed at an angle with respect to the vertical axis of the housing when viewed in side elevation, as shown in FIG. 4. Preferably, this angle of inclination of the marginal end edge 17 is 45°. By this arrangement, the housing has a truncated cylindrical construction adjacent the end which defines a relatively long upper portion and a relatively short lower portion disposed in tangential relationship with respect to the base 12. Accordingly, the upper longer portion is disposed above and at an angle of about 180° from the lower shorter portion. As shown, the axial length of the upper longer portion is approximately equal to the maximum transverse dimension (diameter) of the housing 10 when the angular orientation of the opening 16 is about 45°.

In accordance with the invention, a fluid pressure responsive means 18 is operably associated with the end of the housing 10 adjacent the opening 16. In the form shown, the fluid pressure responsive means 18 includes a generally flat plate 19 which is connected for pivotal movement adjacent the top of the marginal end edge 17 of the opening. This pivotal connection may be achieved by a hinge 36 and pin 37 arrangement attached to the housing 10 and plate 19, respectively, so that the plate may be pivotally swung about the horizontal axis defined by the pin 37 toward and away from the opening 16. In its normal position, the plate 19 hangs, as by gravity, in a generally vertically oriented position adapted for a generally free swinging movement with respect to the housing 10. By this arrangement, a gaseous fluid stream transmitted through the housing 10 and out through the opening 16 acts to impinge upon the confronting inner surface 21 of the plate 19 so as to pivotally swing the plate outwardly in a clockwise direction about the pivot axis 37, as seen in FIG. 4. Though in the form shown (FIG. 3) the plate 19 is illustrated as being of a generally elliptical shape, it is to be understod that the plate may be of any suitable configuration which will afford sufficient impingement area for the gaseous fluid stream discharged through the opening 16.

Figure 3:
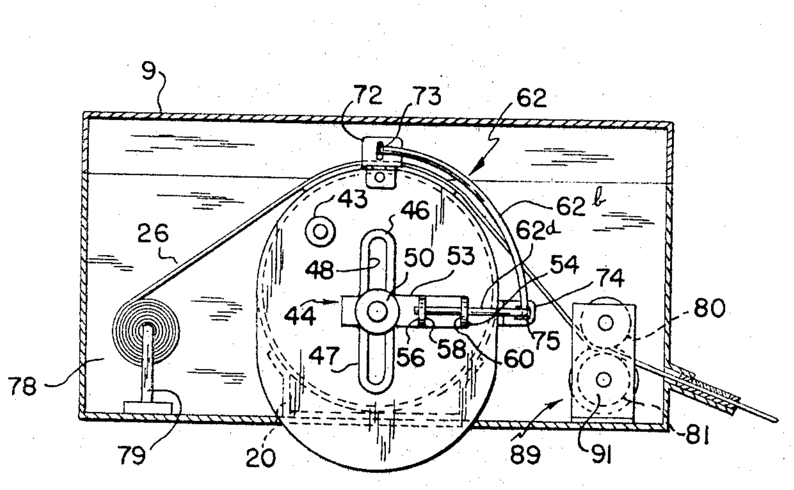
FIG. 3 is a front elevation view of the device shown in FIG. 2.

As best seen in FIGS. 3 and 4, an adjustable counterweight means 42 may be operably connected to the plate 19 for stabilization thereof. In the form shown, the counter-weight means 42 includes a cylindrical sleeve 43 disposed for threaded engagement on a threaded stud member 45 which is attached to and which extends outwardly from the plate 19. It is preferred that the counter-weight means 42 be disposed above the geometric center of the plate 19 and below the pivot point 37. In addition, it is preferred that the counter-weight means 42 be disposed in laterally off-set relation to one side with respect to a vertical plane passing through the geometric center of the plate 19 and the pivot point 37, as best seen in FIGS 2 and 3. By this arrangement, the inertia of the plate 19 (i.e. response to movement by the gaseous fluid stream) may be selectively and precisely controlled to maximize the sensing of pressure variations within the housing and hence, to provide effective determination of the "tuned" operating condition of the engine to be tested. Hence, by threading the sleeve 43 inwardly or outwardly on the threaded stud 45 the inertia of the plate 19 may be controlled by selective adjustment dependent upon the force of the gaseous fluid stream impinged upon the confronting interior surface 21 of the plate 19.

As best seen in FIGS. 2 and 3, an adjustable bracket assembly 44 is mounted on the plate 19. The assembly 44 includes a bracket defined by a pair of oppositely disposed generally U-shaped loop portions 46 and 47 which together define a generally oval-shaped configuration in front elevation, as seen in FIG. 3. The loop portions 46 and 47 extend outwardly from opposed sides of the base member 53 which is disposed against the confronting outer surface 23 of the plate 19. The U-shaped portions 46 and 47 together provide an elongated generally vertically oriented slot 48 which is disposed at right angles to the base member 53 and which is adapted to slidably receive therein a headed fastener 50 which is attached to the plate 19. The base 53 includes a pair of spaced, oppositely disposed upstanding flanges 54 and 56 which include apertures, as at 58 and 60, adapted to receive and rotatably journal therein a portion of a toggle arm 62. By this arrangement, selective adjustment of the bracket assembly 44 enables precise control of longitudinal movement of the toggle arm 62 to provide an effective visual indication and/or recording of pressure variations of the gaseous fluid stream transmitted through the housing 10 irrespective of wide and/or narrow ranges of pivotal movement of the plate 19, as will hereinafter be more full described.

In further accordance with the invention, the recording means 65 includes a transcribing device 22, such as a stylus. As best seen in FIG. 4, the stylus 22 may include a head 66 and a pointed end portion 68 disposed for transcribing contact with an indicia receiving means 26. The stylus 22 in the embodiment shown may be attached to a first linear portion *62a* of the toggle arm 62. The portion *62a* extends at right angles from the indicia receiving means 26 and generally parallel with respect to the longitudinal central axis of the housing 10. The toggle arm 62 is then bent outwardly and angularly downwardly to provide an arcuate portion *62b* which extends transversely of the housing 10. The arcuate portion *62b* is bent adjacent its end to provide a second linear extending portion *62c* which is disposed laterally to one side of the housing 10 and which extends generally parallel to the first linear portion *62a*. The linear portion *62c* is bent adjacent its end to provide a third linear portion *62d* which extends transversely of the housing 10 and at right angles with respect to the linear portion *62c*. The linear portion *62d* extends parallel to the general plane of the plate 19 and is received in journaled relationship within the apertures 58 and 60 in the flanges 54 and 56 of the aforementioned bracket assembly 44. The toggle arm 62 may be attached to the housing 10 by generally L-shaped brackets 72 and 74 which have slots 73 and 75 through which the linear portions *62a* and *62c* of the toggle arm 62 are slidably disposed. The bracket 72 acts to maintain the linear portion *62a* in axial alignment with the longitudinal central axis of the housing 10 while the bracket 74 acts to support the linear portion *62c* in laterally spaced relationship outwardly from the housing 10, thereby to provide sufficient clearance between the toggle arm 62 and the plate 19. The toggle arm 62 may be of a one-piece construction or may be of a multiple piece construction which is hinged, as at 70, to prevent undue flexure of the linear portion 62c upon pivotal movement of the plate 19 in an outward direction away from the opening 16. In addition, such hinged connection prevents flexure in the linear portion *62c* upon vertical adjustment of the bracket assembly 44.

In operation, the bracket assembly 44 is shown (FIG. 2) with the headed fastener 50 centered at the mid-point of the slot 48 between the opposed U-shaped portions 46 and 47 and with the plate 19 in a generally vertically oriented position. In this position, any force imparted to the plate 19 from the gaseous fluid stream transmitted through the housing 10 causes pivotal movement of the plate 19 in an outward or clockwise direction so as to cause reciprocal longitudinal movement of the toggle arm 62 which mounts the stylus 22. Accordingly, by selective vertical adjustment of the bracket assembly 44 (i.e. via the headed fastener 50 in slot 48) the longitudinal reciprocal movement or "throw" of the toggle arm 62 can be adjusted to increase or decrease the range of reciprocal movement imparted to the stylus 22. Accordingly, by this arrangement the amplitude of the indicia transcribed on the indicia receiving means 26 may be increased or decreased for a predetermined pattern or scale, as desired.

In the invention, it is preferred that a rigid, fluid supporting surface be provided below the pointed end portion 68 of the stylus 22. As best seen in FIG. 2, an arcuate plate 76 made of metal or the like may be mounted on the upper exterior surface of the housing 10 which may be bent to conform to the general contour of the housing.

The indicia receiving means 26 which is supported upon the plate 76 below the stylus 22 to receive indica transcribed thereon by the pointed end portion 68 may comprise any suitable transcription material, such as a paper tape or the like.

In further accordance with the invention, the recording mechanism 65 further includes a tensioning arrangement for delivering the indicia receiving means 26 in tensioned relationship over the plate 76 and below the stylus 22. As best seen in FIGS. 2 and 3, this arrangement includes a supply roll 78 mounted on the base 12 by a bracket 79 for paying the indicia receiving material 26 therefrom. A tensioning means 89 may be disposed on the opposite side of the housing 10 by another bracket 91 attached to the base 12. As shown, the tensioning means 89 may include a pair of superposed compression rolls 80 and 81 which are rotatably mounted on the bracket 91. The upper roll 80 constitutes a driven roll while the lower roll 81 constitutes a driving roll which may be connected by means of a flexible coupling 84 to a suitable power means 82, such as an electric motor, mounted on the base 12. The vertical spacing between the rolls 80 and 81 may be sufficient to grippingly engage the indica receiving means 26 disposed therebetween. Thus by rotating the drive roll 81 in a clockwise direction (FIG. 3) the indica receiving means 26 will be drawn-off the supply roll 78 and in predetermined tensioned relationship over the plate 76 and under the stylus 22. The electric motor 82 may be of the variable speed type or suitable speed reduction means (not shown) may be provided so as to control the speed of the indicia receiving means 26 drawn off the supply roll 78.

From the tensioning means 89 the indicia receiving means 26 is directed beneath a scale 86 having a window-like opening 93 therein. The scale 86 may be calibrated in r.p.m.'s, so as to enable the operator to visually compare the scale calibrations with the transcribed indicia 94, such as wave forms, transcribed on the indicia receiving means 26 (tape).

The device of the present invention may be employed to determine pressure variations from idle speeds up to 3000 r.p.m.'s of the engine. At normal operating conditions, no wave form will be produced and the stylus 22 will transcribe a generally straight line on the indicia receiving means 26. Any decrease or increase or interruption of the gaseous fluid stream passing through the housing 10 will automatically actuate the fluid pressure responsive means 18 so that such variations are translated into wave forms which are visually indicated and/or recorded on the indicia receiving means 26. The wave forms transcribed on the indicia receiving means 26 may then be employed as a basis for comparison with engines having known operating condition. Accordingly, the device may be readily employed to determine the proper operating conditions for efficient combustion, such as engine vacuum, fuel, compression and ignition for normal operation.

The terms and expressions which have been used, are used as terms of description and not of limitation, and there is no intention in the use of such terms and expressions of excluding any equivalents of any of the features shown and described, or portions thereof, and it is recognized that various modifications are possible within the scope of the invention claimed.

I claim:

1. A sensing and recording device adapted for sensing and recording the pressure variations of the emissions of exhaust gases of an internal combustion engine comprising, a hollow housing having an inlet and outlet end, said inlet end being adapted for connection to the exhaust line of an internal combustion engine, said housing defining a passageway communicating said inlet end with said outlet end for directing the flow of gaseous fluid therebetween, a pressure responsive means pivotally connected adjacent the outlet end of said housing and adapted for impingement by said gaseous fluid flowing therethrough, said pressure responsive means including a plate member adapted for swinging movement in response to pressure variations of said gaseous fluid, said plate being disposed in spaced relation to said outlet end and in a generally vertically oriented position when at rest and pivotal about said connection end in opposite directions from said vertical position upon variation in pressure of said gaseous fluid, a recording means including transcribing means and indicia receiving means, said transcribing means operably connected at one end to said plate member and at the other end adapted for transcribing coacting engagement with said indicia means to record movements of said plate member in response to variations in pressure of the gaseous fluid flow.

2. A sensing and recording device in accordance with claim 1, wherein said housing comprises a truncated cylindrical configuration adjacent said outlet end including a long upper portion and a shorter lower portion, said upper portion being diametrically opposed to said lower portion, and said plate member connected to said housing adjacent said upper portion to enable said plate member to be freely displaced in opposite directions from said vertical position.

3. A sensing and recording device in accordance with claim 2, wherein said outlet end is defined by a marginal end edge disposed angularly with respect to the longitudinal central axis of said housing.

4. A sensing and recording device in accordance with claim 3, wherein said plate member is connected to said housing adjacent said marginal end edge.

5. A sensing and recording device in accordance with claim 1, including a counterweight means operably associated with said plate member to vary the effective weight of said plate member and the displacement of said plate member with respect to said vertical position.

6. A sensing and recording device in accordance with claim 1, including a bracket member adjustably mounted on said plate member and movably supporting said transcribing means for adjusting the movement of said transcribing means with respect to said indicia receiving means.

7. A sensing and recording device in accordance with claim 6, wherein said transcribing means includes an elongated arm pivotally connected to said bracket member, and said bracket member being slidably movable with respect to said plate member.

8. A sensing and recording device in accordance with claim 1, wherein said indicia receiving means includes a continuous flat tape disposed for transverse movement relative to said housing.

9. A sensing and recording device in accordance with claim 1, wherein said passageway is generally linear, and the general plane of said plate member, when in the at rest position, is generally perpendicular with respect to the central axis of said housing.

10. A sensing and recording device in accordance with claim 7, wherein said transcribing means includes a stylus member connected adjacent the opposite end of said elongated arm adapted for transcribing coacting engagement with said indicia receiving member to record the movements of said plate member.

11. A sensing and recording device in accordance with claim 1, including a tensioning means operably coacting with said indicia receiving means for moving same in tensioned relation with respect to said transcribing means and transversely of said housing.

12. A sensing and recording device in accordance with claim 11, wherein said tensioning means includes a drive means and a driven means, a continuous tape member disposed in tensioned relation between said drive means and said driven member, and said drive means being operable to move said tape transversely of said housing.

13. A sensing and recording device in accordance with claim 12, including a drive member adapted for driving said driven member, said drive motor including adjustable means for varying the speed of the movement of said tapes with respect to said stylus member.

14. A sensing and recording device adapted for sensing and recording the pressure variations of the exhaust gases of the internal combustion engine comprising a hollow housing having an inlet end and an outlet end, said outlet end adapted for connection to the exhaust line of the internal combustion engine, said housing defining a passageway communicating said inlet end with said outlet end for directing the flow of gaseous fluid therebetween, a pendulum-like impingement plate pivotally connected adjacent the outlet end of said housing and adapted for impingement by said gaseous fluid flowing therethrough, said housing comprising a truncated cylindrical configuration adjacent the outlet end when viewed in side elevation including a long upper portion and shorter lower portion, said outlet end having a marginal edge defining a plane which is angularly disposed with respect to the central axis of said housing, said axis being disposed generally perpendicularly with respect to the general plane of said plate, said plate being connected at said edge adjacent said longer portion and disposed in a generally vertically oriented position when at rest and freely swingable for displacement in opposite directions from said vertical position in response to variation in the pressure of said gaseous fluid, a counterweight means operably associated with said plate to vary the effective weight of said plate and the displacement distance of said plate with respect to said vertical position, a recording means including a transcribing member and indicia receiving member, said transcribing member including an elongated arm operably connected at one end to said plate and at the other end to a stylus element, said stylus element being adapted for transcribing coating engagement with said indicia receiving member to record the movements of said plate, and bracket member adjustably mounted on said plate for slidable movement thereon for varying the movement of said stylus with respect to said indicia receiving member.

References Cited

UNITED STATES PATENTS

| | | | |
|---|---|---|---|
| 408,938 | 8/1889 | Tata | 346—72 X |
| 1,063,255 | 6/1913 | Hanks | 346—36 |
| 2,557,001 | 6/1951 | Paulsen | 346—36 |

STEPHEN J. TOMSKY, *Primary Examiner.*

JOSEPH W. HARTARY, *Assistant Examiner.*

U.S. Cl. X.R.

346—114; 73—115, 391